United States Patent

Bislev et al.

[11] Patent Number: 5,942,022
[45] Date of Patent: Aug. 24, 1999

[54] COMPOSTING PLANT FOR ORGANIC WASTE AND METHOD FOR COMPOSTING SUCH WASTE

[75] Inventors: Vagn Bislev, Bjerringbro; Per Thostrup, Viborg, both of Denmark

[73] Assignees: Maskinfabriken Samson Tange A/S, Bjerringbrovej; Bioplan A/S, Viborg, both of Denmark

[21] Appl. No.: 08/656,290
[22] PCT Filed: Dec. 6, 1994
[86] PCT No.: PCT/DK94/00459
 § 371 Date: Aug. 8, 1996
 § 102(e) Date: Aug. 8, 1996
[87] PCT Pub. No.: WO95/15933
 PCT Pub. Date: Jun. 15, 1995

[30] Foreign Application Priority Data

Dec. 6, 1993 [DK] Denmark .................. 1361/93

[51] Int. Cl.⁶ .............. C05F 11/08; C12M 1/38
[52] U.S. Cl. .............. 71/9; 210/613; 210/614; 210/620; 435/290.1; 435/290.2
[58] Field of Search .................. 210/613, 614, 210/620; 71/9, 10; 435/313, 315, 290.1, 290.2

[56] References Cited

U.S. PATENT DOCUMENTS

| | | | |
|---|---|---|---|
| 4,062,770 | 12/1977 | Kneer | 210/12 |
| 4,410,348 | 10/1983 | Ito et al. | 71/9 |
| 4,414,335 | 11/1983 | Kipp, Jr. | 435/313 |
| 4,798,802 | 1/1989 | Ryan | 71/9 |
| 4,909,825 | 3/1990 | Eigner | 71/9 |
| 5,023,178 | 6/1991 | Schiene et al. | 71/9 |
| 5,049,486 | 9/1991 | Blackwood et al. | 71/9 |
| 5,076,827 | 12/1991 | Johnson | 71/9 |
| 5,409,831 | 4/1995 | Wright | 435/313 |

*Primary Examiner*—Wayne Langel
*Attorney, Agent, or Firm*—Watson Cole Grindle Watson, PLLC

[57] ABSTRACT

A composting plant and method for composting organic waste such as household waste separated at the source, sludge, wood chippings, straw, farmyard manure. The plant comprises a sealed compartment with an inlet zone with a device for feeding in the waste which is advanced from a receiving and preprocessing plant through an airtight sluice device; a process zone with one or more devices preferably a texturing agitator (14) suspended in a runner (46) for advancing and aerating of the waste from the inlet zone and through the process zone to an outlet zone with devices (18) for discharging the composted waste from the compartment. The bottom of the process zone which is connected to a ventilating equipment (26, 30, 34) is designed in such a manner that an aeration takes place up through the waste heap preferably via a bottom layer of coarse organic material such as wood chippings. The ventilator equipment is arranged with fresh air intake and intake from the compartment for controlling the oxygen concentration and the temperature. In the plant a heat exchange system is arranged for extraction of the heat generated from the process air and for condensing the water from it for drying the compost. The process temperature is kept in the range of 55–62° C. and the optimum oxygen concentration for the putrefactive process is maintained. The residence time in the process zone is of the approximate duration 5 to 25 days.

13 Claims, 6 Drawing Sheets

COMPOSTING PLANT FOR ORGANIC WASTE AND METHOD FOR COMPOSTING SUCH WASTE

BACKGROUND OF THE INVENTION

The present invention relates to a composting plant for composting organic material such as household waste separated at the source, organic sludge from waste water treatment plants and industries, wood chippings, straw and farmyard manure, as well as to a method for composting such waste.

The simplest way of dealing with organic waste is to simply store the waste at a refuse dump. However which, however, this may entail serious environmental problems such as pollution of the ground water, gas emission, leachate, odour, contamination, dissemination, etc. Alternatively the organic waste can be composted by being fragmented, mixed and deposited in a pit or stack. In order to achieve the optimum conditions such as supply of the necessary quantity of oxygen, the waste is aerated from time to time by shifting the stacks. The composted waste can be used as a means of soil amelioration. Both cases are energy consuming.

The waste may otherwise be disposed of by incineration, by which a certain energy output can be recovered. This, however, entails a need for flue gas purification and disposal of the ashes. Furthermore, the initial costs are rather exorbitant. Organic, waste can also be treated in biogas plants, during which inflammable gases are generated. The degassed material can be used as organic fertilizer. The object is to provide a simple, reliable and effective composting plant having low establishing and operating costs and having a high degree of stabilizing of the composted waste which upon completion of the process can be utilized as a growth substance described as quality compost.

From SE-A 366 289 a composting plant is known where the compost material is advanced by means of a row of spirals and where the aeration takes place through the spiral shafts.

From U.S. Pat. No. 410,348 discloses is known a plant where the compost material is placed in a pit and is turned from time to time by a special turnover machine. From DE-C 36 37 393 is mown a plant where the compost material is aerated from ace bottom. In none of these cases is the generated heat energy utilized. From DE-A 42 08 390 is known a system for removal of odorants in the exhaust fumes from a composting plant.

The object of the invention is to provide a composting plant with an active usage of the heat energy generated at the putrefactive process, at the same time achieving a high quality of the finished composted material and without the plant causing any odour nuisance.

SUMMARY OF THE INVENTION

This is achieved according to the invention by a composting plant which includes a sealed compartment with an inlet zone with a device for feeding the waste that is advanced from a receiving and preprocessing plant and one or more devices for advancing and aeration of the waste from the inlet zone and through the process zone to an outlet zone with devices for discharging of the now composted waste from the compartment, and where the bottom of the process zone which is in connection with a ventilating plant is arranged such that an aeration is performed up through the waste heap and where the ventilator plant is provided with a fresh air intake and an intake from the compartment and with controlling of the oxygen concentration and the temperature and where a heat exchange system is arranged in the compartment above the waste heap for extracting the generated heat and condensing of the water from the air.

At the bottom of the residence zone a layer of wood chippings is spread where the waste material is spread.

The device for advancing the waste material across the process zone is designed as a driven texturing agitator suspended as a runner above the process zone.

The protruding spikes of the texturing agitator are arranged in one or more helicals such that the material is moved along a horizontal plane, is lifted, fragmented, textured and homogenized when the agitator runs through the material whereby it is loosened as the material otherwise gradually becomes compressed and obtains a denser texture as a consequence of the advancing putrefaction and thereby renders the aeration difficult.

The suspension of the texturing agitator is arranged such that, from its downwardly suspended position, it can be swung up above the waste heap in the residence zone, which increases the movements of the agitator as it at the outlet zone can be swung up at the outlet zone and run back above the compost heap.

The texturing agitator is arranged as an agitator motor, the motor being integrated in the actual agitator.

When the agitator in its open position is advanced above the compost heap, there is a risk that newly introduced material hat might stick to the agitator will fall off over composted material such that no absolute guarantee can be given that the material is free from germs. This can be counteracted by the texturing agitator first treating, i.e., running through the compost heap closest to the outlet zone, and then treating the remaining compost heap closest to the inlet. Should some newly introduced material happen to drop down over the half-way composted material, then this is of minor significance as this will be sanitarized before arriving at the outlet zone. At the operating temperatures present in the plant the sanitarization lasts from a few hours to 24 hours. It is understood that basically it is a question of only very small quantities that can stick to the agitator. Another solution to the problem is to use two texturing agitators where one operates solely at the inlet side and the other at the outlet side. As possibility a third agitator may be fitted between the two first mentioned exclusively for treating the compost heap in the middle.

The arranging of the spikes of the texturing agitator, the position of same and the rotation and advancing speed of the agitator are matched such that the material does not fall against the agitator when it runs through the compost heap, but is led from one side of the agitator to the other. Furthermore the spikes lift the material a short distance, this counteracting the heap to compress as mentioned above. The texturing mentioned is a turning over of particles causing the particles to be turned relative one another from time to time.

Another problem in the texturing agitator is that the bottom layer which the agitator runs across becomes smoothed, i.e., is flattened and is made compact such that it becomes increasingly difficult for the air to penetrate the layer. This is counteracted by scrapers underneath the bottom the agitator not causing the smoothed effect but scraping up the separating layer. When after the separating layer becomes too compact, it can be loosened by lowering the agitator a little. After a number of runs the separating layer is substituted by new material and can then be run again.

A method for composting organic waste such as household waste separated at the source, sludge, wood chippings, straw, farmyard manure is characterized in that the waste is fed into a sealed compartment where it is advanced over a process zone where an aeration is performed up through the waste heap and where the oxygen concentration necessary for the putrefactive process is kept by intake of fresh air and that a process temperature in the material in the range of 55–62° C. is maintained as the surplus heat is extracted from the circulating air in the compartment, and after a residence time in the process zone of the approximate duration of 5 to 25 days, the now composted waste is discharged from the compartment.

The invention will now be understood in further detail in the following in connection wash the associated drawing illustrating a plant:

DETAILED DESCRIPTION OF THE PREFERRED EMBODIMENTS

Figure 1:
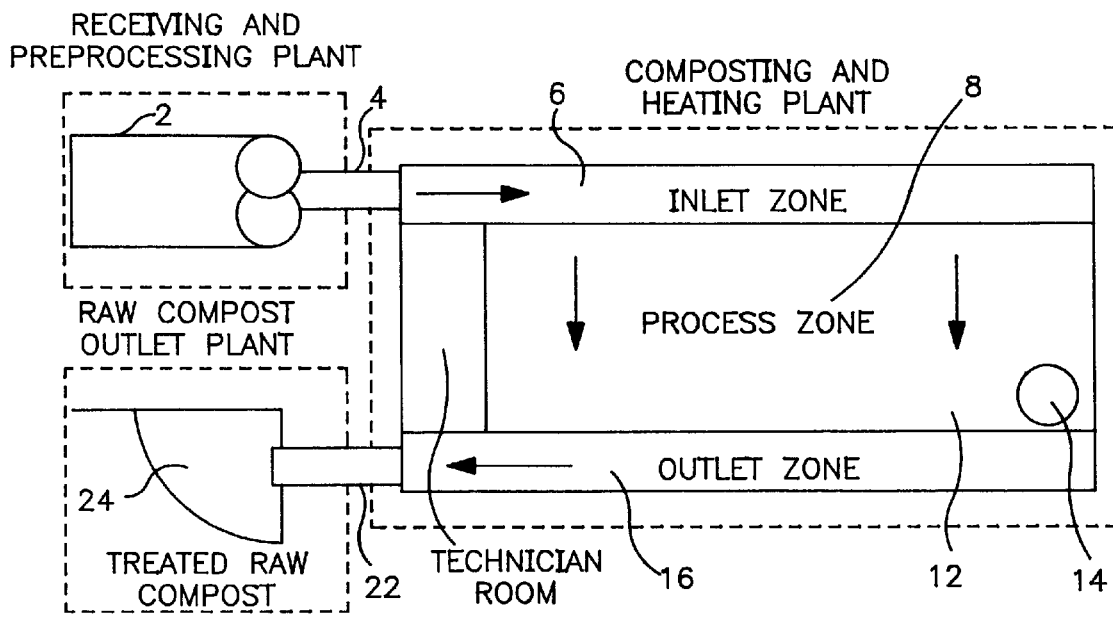
FIG. 1 is a schematic representation of a composting plant according to the invention.

The plant includes a receiving and preprocessing plant 2 for the organic material to be composted. The material is here subject to a fragmentation before being advanced by a conveyor 4 to an inlet zone 6 in a sealed compartment 8. In the receiving and preprocessing plant 2 a mixing of various types of raw materials can be performed depending on which type of compost that is required.

The entrance of the conveyor 4 into the sealed compartment has the shape of a tube and possibly with a reduced cross section 10 (FIG. 2) which is totally filled during the feeding and in which a plug of material is formed which seals off the air.

From the inlet zone 6 the material is advanced over a process zone 12 by an especially designed texturing agitator 14 which in a predefined pattern gradually moves the material over to an outlet zone 16 from where the material as finished raw compost is discharged from the compartment. There is a scraper conveyor 18 (FIG. 2) at the bottom of the outlet zone which advances the compost out through a pipe 20 in the compartment and it is possibly advanced further by another conveyor 22 to a collection site 24.

Similarly, in the outlet pipe, which may also have a reduced cross section, a plug of compost is formed sealing off the air.

In the residence zone the material is aerated by means of an underlying aerating system whereby an air current penetrates up through the material. As can be seen from FIG. 2, the aeration system can be constituted by a perforated tube system 26 laid out directly at the bottom in the compartment. Over the tube system 26 a bottom layer of raw wood chippings 28 (FIG. 4) or similar material is laid out at which layer the introduced material lies. The wood chippings protect the tube system as well as the bottom of the texturing agitator 14 which thereby is kept off the solid bottom and the air relatively easily penetrates the wood chippings and enters into the material lying above.

Figure 2:
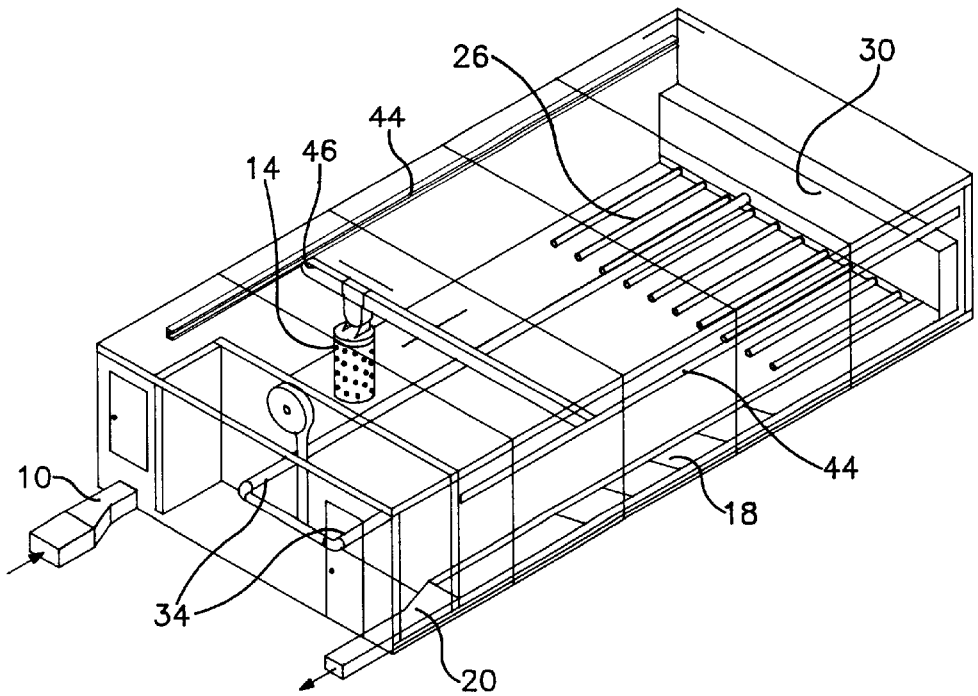
FIG. 2 is a schematic perspective X-ray view of a plant according to the invention, but shown without inlet and preprocessing plants and without the receptacle for the finished raw compost.
Figure 7:
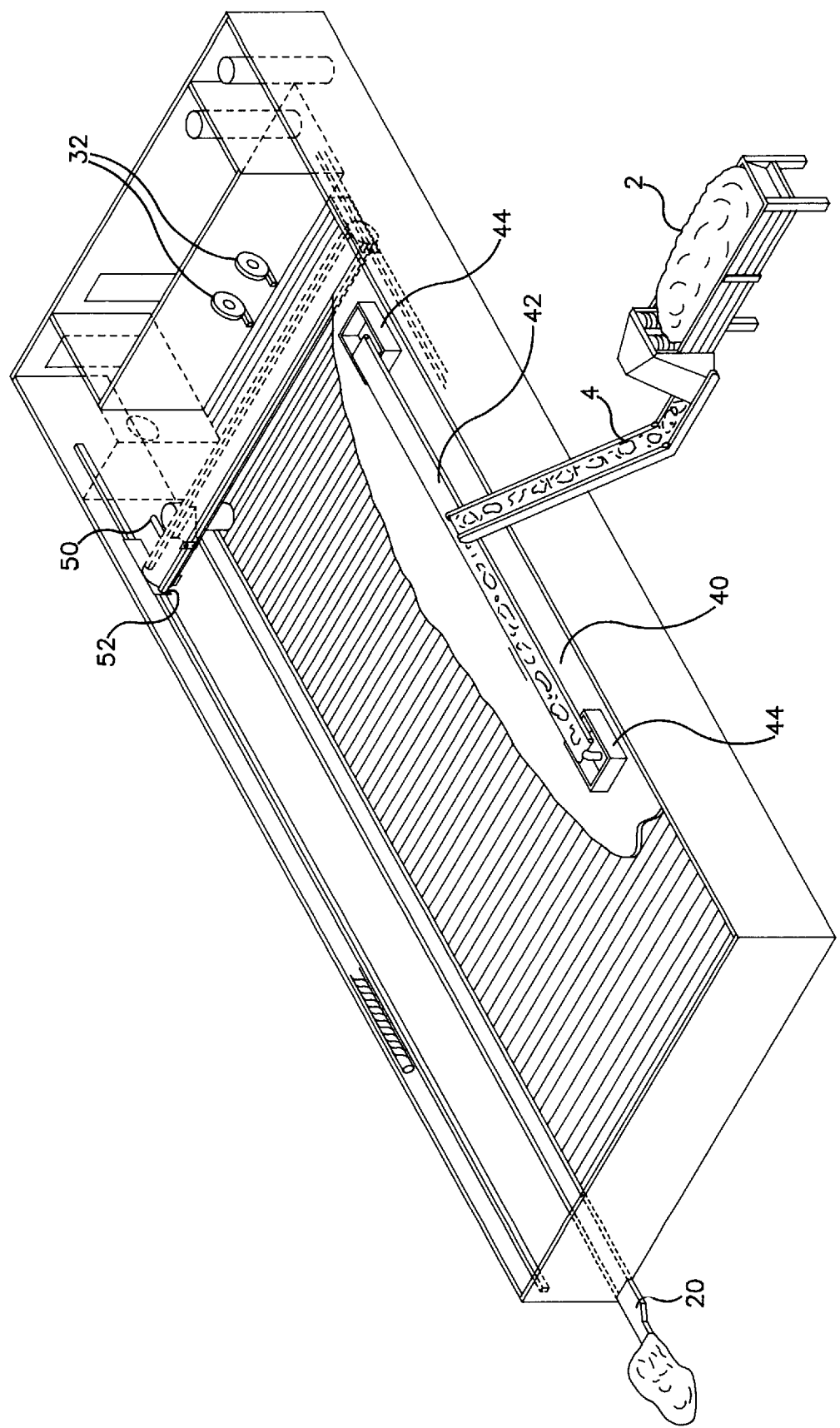
FIG. 7 is a perspective view of another embodiment of the plant according to the invention.

From time to time it may become necessary to clean out the bottom layer and to facilitate this, a bottom of iron sheet can be laid out such that the bottom can be cleaned by a mini digger. For distributing the air the tubes in the tube system can start from an air distributor box 30 situated at one end of the compartment as shown in FIG. 2. The air is delivered by a ventilator 32 from which the air via two ducts 34 is led to the distributor box 30. Instead of or in larger plants two ventilators may be present as shown in FIG. 7.

Figure 4:
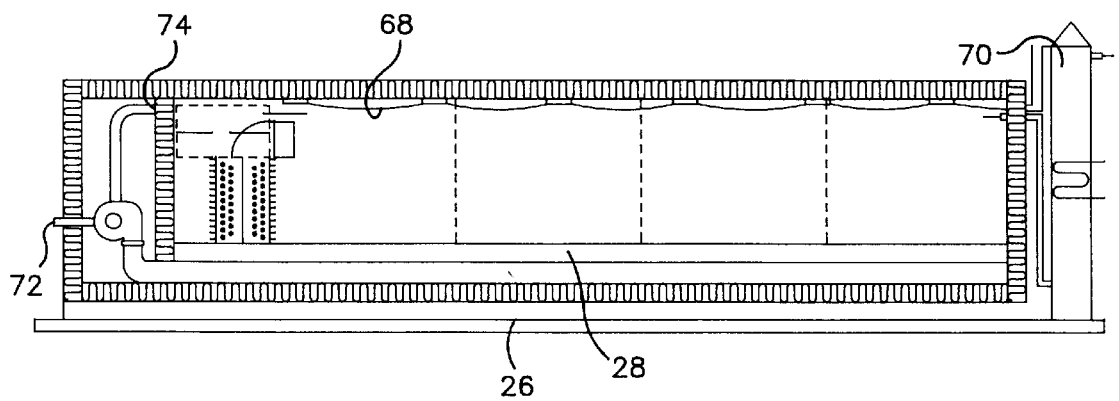
FIG. 4 is a longitudinal section in FIG. 3 along line 4—4.
Figure 3:
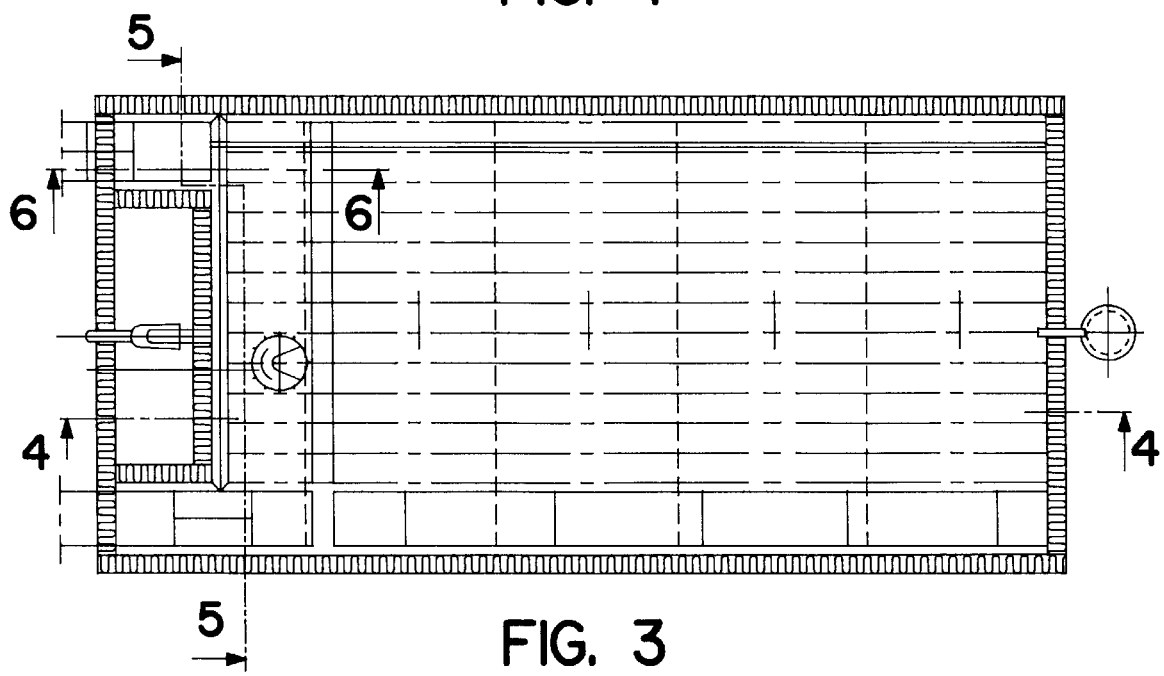
FIG. 3 is a representation of a more realistic embodiment of the plant according to the invention and also shown without connections like in FIG. 2.
Figure 5:
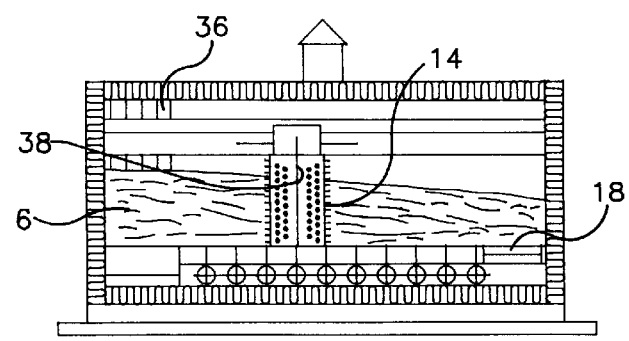
FIG. 5 is a transverse section in FIG. 3 along line 5—5.

The mixed and homogeneous material from the receiving and preprocessing plant can be distributed by a distributor plant that can be arranged as a grip arrangement 36 above the zone as shown in FIGS. 3–5.

Figure 6:
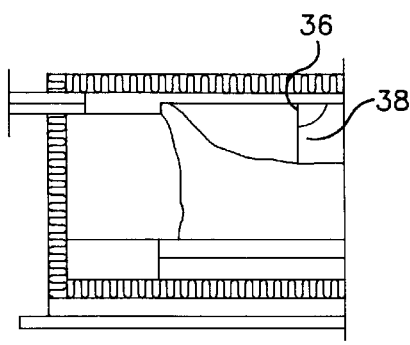
FIG. 6 is a longitudinal section of the entrance of the inlet zone FIG. 3 along line 6—6.

The arrangement comprises a number of downwardly suspended grips 38 mounted at a reciprocating shaft moved by a hydraulic cylinder. The grips are mounted such that they glide or swing up above the material at the return movement of the shaft, but at the forward movement are kept down and thereby advances the fed material until it lies as a smooth layer in the entire length of the inlet zone. In contrast to FIG. 2, the feeding in FIG. 6 takes place at the top of the compartment, but the grip arrangement is practical in both instances. In the plant shown in FIG. 7 the feeding takes place in a somewhat different way: here the material is advanced by a conveyor 4 up to the roof 40 of the compartment where the material is delivered at a band conveyor 42 terminating above two air locks 44 where the material is delivered for massage into the compartment. The band conveyor is arranged such that it can run in either direction and deliver the material into the two air locks every alternate turn. In larger plants this improves the distribution of the fed material.

Figure 8:
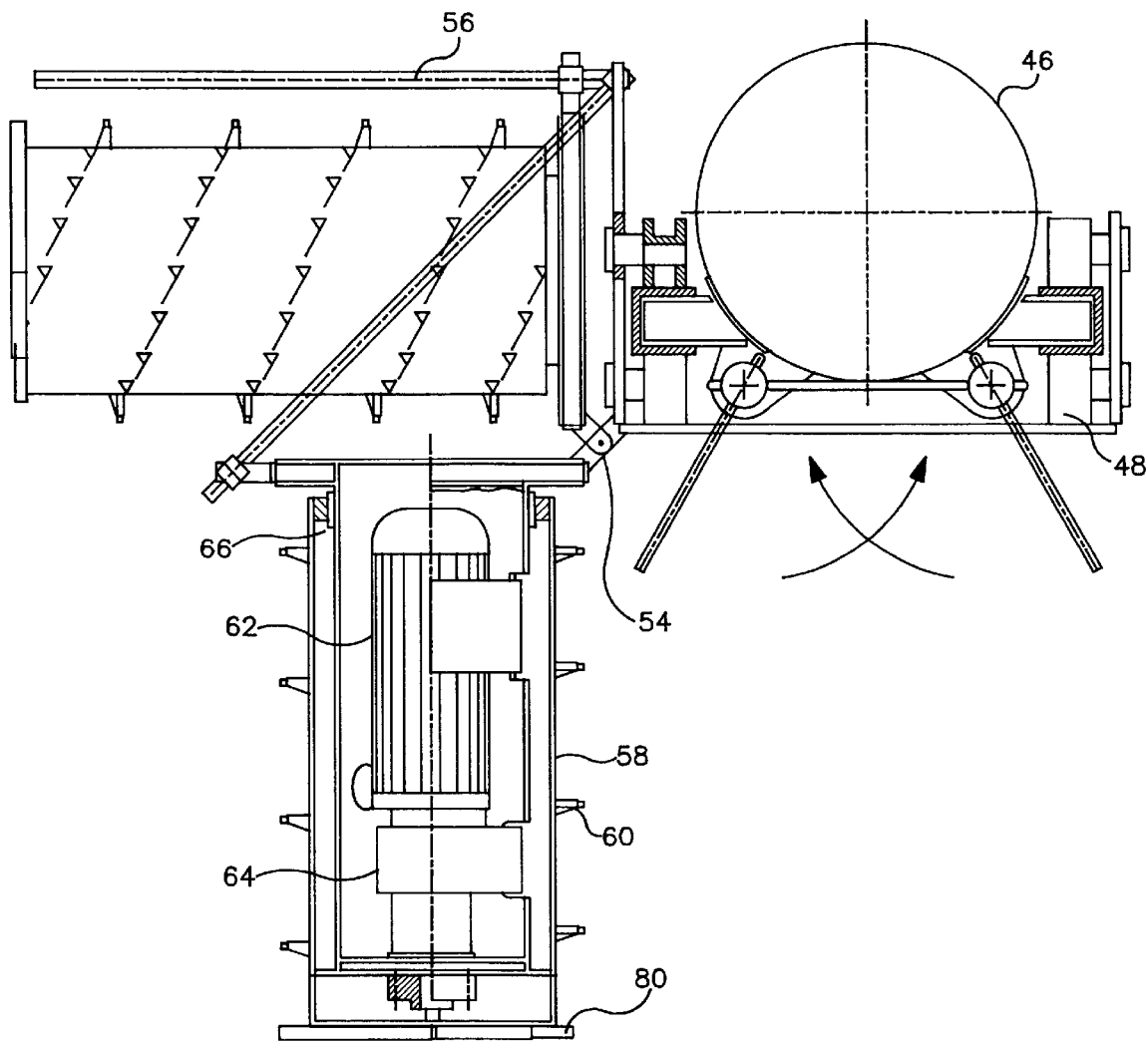
FIG. 8 is a transverse section in the texturing agitator in lowered position and in open position as a whole.

As stated the material is moved from the inlet zone 6 via the process zone to the outlet zone 16 by means of a texturing agitator 14 as shown in FIGS. 8. The agitator is suspended in a runner comprising a bar 44 at either side of the compartment between which a traverse 46 reaches at which the agitator is suspended. The embodiment shown in FIG. 8 is characteristic in that the traverse 46 has the shape of a tube. The agitator is suspended at a trolley 48 that can move along the traverse. The trolley is pulled by a motor 50 as shown in FIG. 7 and the traverse is pulled along the rails by the motor 52. The agitator is suspended by hinges to the trolley such that it can rotate from a suspended to a horizontal raised position as indicated. For stabilizing the agitator a rod 56 is pivotally mounted to the trolley and to the outer side of the agitator by a slide fitting. The agitator comprises a cylinder piece 58 with protruding spikes 60 placed in a helical. Inside the agitator there is a motor 62 with a transmission 64, the cylinder piece being fastened directly to the transmission shaft. At its top the cylinder piece is guided in a slide bearing 66. At servicing the agitator is swung up and the cylinder piece is pulled off upon loosening the mounting screws in the hub. It turns out that the lowermost portion of the agitator is most prone to wear. The worn portion can be cut away and be replaced by a new piece and in a similar manner the new piece can be extended concurrently with the wear to the layer of chippings at the bottom. This, however, may be avoided by providing he bottom of the agitator with scrapers 80, e.g., in the form of three pieces of angle or flat bar placed at 120 degrees interval. The scrapers are placed flushing with the spikes 60. Thereby wear to the cylinder bottom is eliminated or minimized at the same time achieving the essential point of scraping up the dividing layer underneath the agitator leaving it open to air permeability from the bottom. In a further embodiment of the agitator this has an outer casing with the spikes mounted in this. The casing is suitably divided into three shields that expand 120 degrees and are secured to the cylinder. Furthermore the bottom is arranged as a loose cylinder piece that is placed at the end of the cylinder. The cylinder piece is bolted in oblong holes which of offers easy access to lowering the bottom for paring off the dividing layer when it becomes too compact.

The initial position of the texturing agitator is shown in FIG. 14. From the lowermost right hand corner the agitator is moved towards the inlet zone whereby the material being closest is advanced to the empty outlet zone and the succeeding material is advanced a step. The fresh material in the inlet zone is advanced to the process zone. The agitator is swung up and the traverse is moved a step to the side and the agitator is run across the outlet zone and upon this it is run through the material that has now entered the process zone. The pattern of movement is repeated until the agitator reaches the upper left hand corner where the feeding occurs. The agitator is swung up and returns to the starting position at the lowermost right hand corner. Upon this a discharge of the composted material can be performed in the outlet zone and fresh material can be fed. The control system, by the way, is arranged such that the inlet and outlet cannot take place during the running of the texturing agitator. The residence time of the material in the plant is approximately 21 days whereby supplementary plants for consequent composting is superfluous at the same time utilizing the generated heat energy. Furthermore the finished compost meets with the strictest quality demands, i.e., the material may immediately be used as planting soil. The material thus satisfies the German requirements to "Rottgrad 4".

During the advancing putrefaction the material compacts. This is counteracted by the special position of the sales at the agitator. Placed in a helical they lift the material during the run, The shifting and the spikes in themselves cause a stirring of the material which becomes fragmented further.

Figure 9:
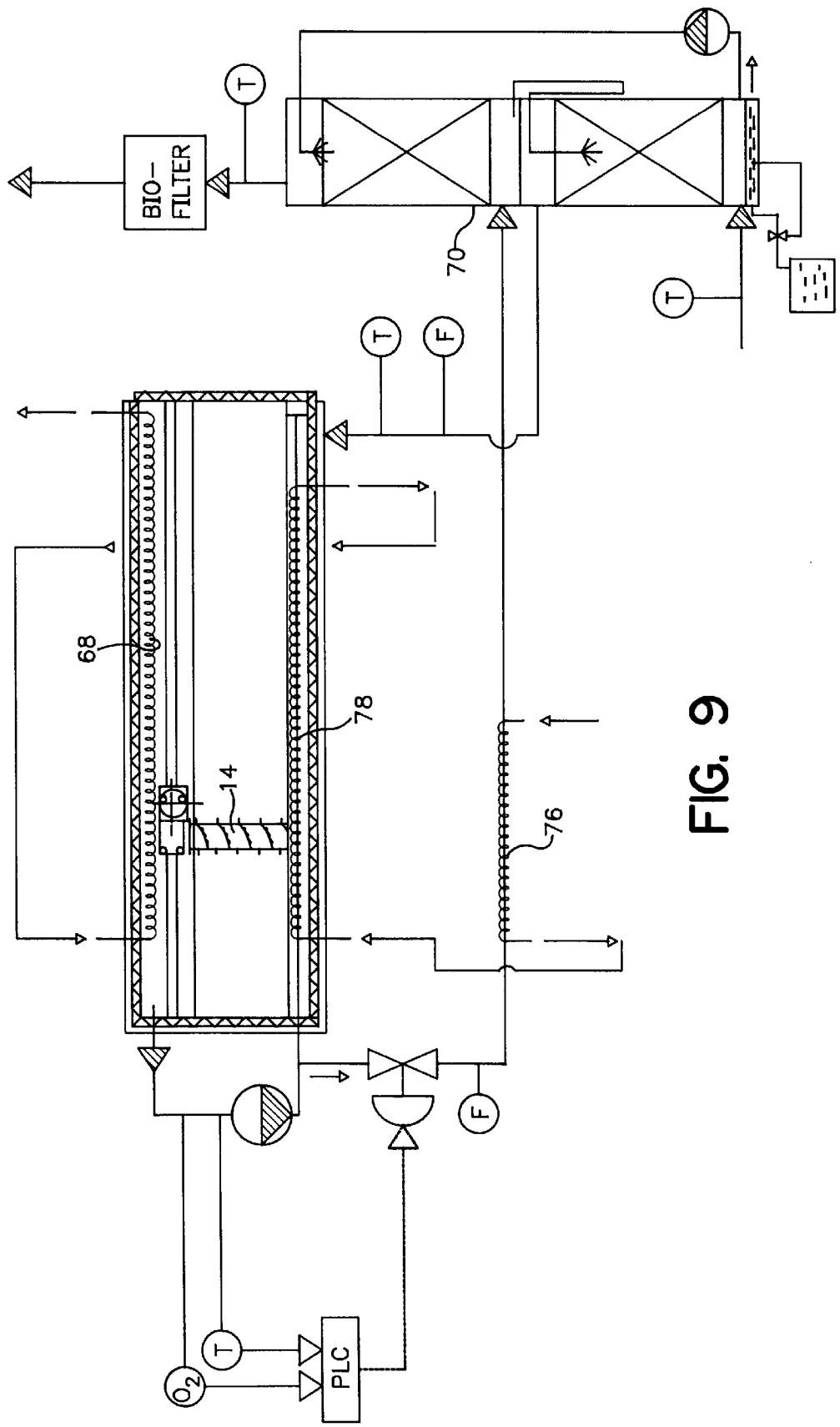
FIG. 9 is a schematic diagram of the operation of the plant.

A process temperature in the plant of 55–62° C. is aimed at. The surplus heat is extracted from the air by a heat exchange system. As shown in FIG. 9 this system comprises a heat exchanger 76 in the air vent from the plant. The exchanger is in the reverse air current to the exhausted air. From this heat exchanger the preheated water runs to another heat exchanger 78 placed at the bottom of the plant. The further heated water eventually runs to a heat exchanger 68 placed below the roof of the plant. The heated water can typically be utilized for heating purposes. The hot, humid exhaust air is led into the upper chamber in a cooling tower 70 in the reverse flow of a water flow washing away particles and odours from the air as well as extracting the heat energy from it. If a further cleaning of the exhaust air is necessary, the outlet from the cooling tower can be provided with a biofilter for removal of odours. The heated water from the upper chamber of the cooling tower flows down to its lowermost chamber in the reverse air current to a fresh air intake for preheating and humidifying of the fresh air that is introduced into the plant. If the fresh air is dry, e.g., in winter or in a dry climate, the humidification is a necessity for maintaining the correct humidity in the plant, otherwise the compost material dries up. The dripping condensate is collected at the bottom of the cooling tower where it is neutralized by adding acid, e.g., sulphuric acid—the condensate is typically alkaline due to the ammonia in the air from the plant. The condensate is collected and used as chemical fertilizer. A quantity of approx. 500 liters per day is not unusual but of course the quantity depends on the size of the plant. The ventilating system is arranged such that a certain renewal of the air in the chamber takes place. This is controlled by the combined oxygen concentration and the temperature in the exhaust air from the plant by means of a computer operating an air damper controlling the quantity of recirculated air to the plant and thereby indirectly the intake of air drawn in. If the oxygen concentration falls, more fresh air is introduced for maintaining the optimum quantity of oxygen necessary for the putrefactive process. Similarly, the temperature is controlled by means of the heat exchanger system, cooling tower as well as introduction of fresh air. For instance in the summer when less heat is used it becomes necessary having a large air exchange in order to keep down the temperature in the plant, whereas in the winter it is rather the oxygen concentration that determines the air exchange. Otherwise a vacuum is maintained in the sealed compartment to hinder or at least counteract air emission that may cause odour nuisance.

Figure 10:
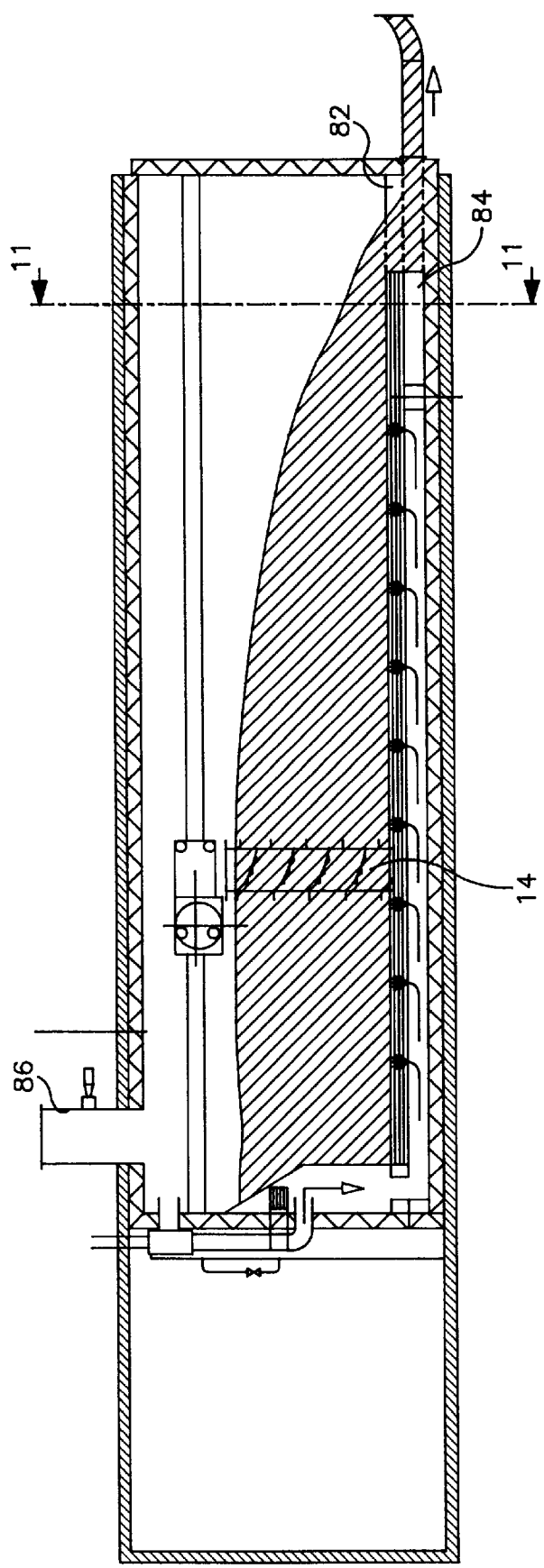
FIG. 10 is a longitudinal section through another embodiment of the plant according to the invention in stalled into a mobile container.
Figure 11:
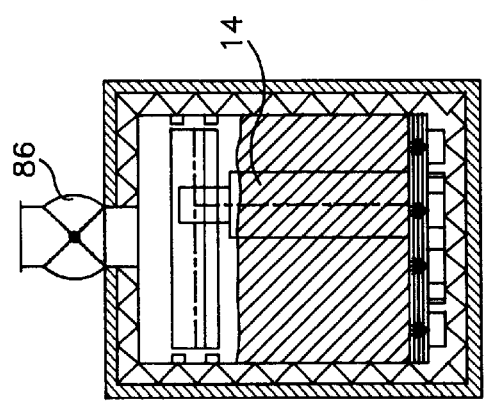
FIG. 11 is a transverse section through the plant shown in FIG. 10.

In FIGS. 10 and 11 another embodiment of the plant according to the invention is shown installed inside an export container such that it is easy to ship. The principle of the construction is the same as previously disclosed, however, the material is advanced in the longitudinal direction of the container. At the far end the material falls down into a pit 82 wherefrom it is discharged by a piston 84. The feeding is performed by a feeder 86 consisting of a cross driven by a motor. The invention thus provides an efficient composting plant having low operating and establishment costs. The equipment yields a comparatively large quantity of heat and the raw compost produced is of good quality, i.e., it is not or hardly oxygen consuming at the same time being free from germs.

We claim:

1. A composting plant for composting organic waste including separated household waste, sludge, wood chippings, straw and farmyard manure, said plant comprising a sealed compartment with an inlet zone with a device for feeding in the waste which is advanced from a receiving and preprocessing plant through an airtight sluice device and a process zone and at least one device for horizontally advancing and aerating of the waste from the inlet zone and through the process zone to an outlet zone with devices for discharging the composted waste from the compartment through an airtight sluice device and where the bottom of the process zone which is connected to a ventilating equipment is designed in such a manner that an aeration takes place up through the waste heap and where the ventilator equipment is arranged with fresh air intake and intake from the compartment and with control of the oxygen concentration and the temperature and where a heat exchange system is arranged in the plant for extraction of the heat generated from the process air and for condensing the water from it for drying the compost.

2. A composting plant according to claim 1, wherein a layer of wood chippings or corresponding material has been spread at the bottom of the residence zone at which material the organic waste is spread.

3. A composting plant according to claim 1, wherein the device for feeding of the waste through the process zone comprises a driven texturing agitator suspended from a travelling trolley above the process zone.

4. A composting plant according to claim 3, wherein the texturing agitator has protruding spikes arranged in one or more helicals such that the material be lifted when the agitator treats it.

5. A composting plant according to claim 3, wherein the suspension for the texturing agitator is designed such that it can be swung up above the waste heap in the residence zone from its downwardly suspended position.

6. A composting plant according to claim 3, wherein the texturing agitator is designed as a drum motor having the motor integrated in the actual agitator.

7. A composting plant according to claim 1, wherein the receiving and processing plant is arranged to mix, texture and feed the organic material to an inlet conveyor that advances the raw material up above the inlet zone outside the sealed compartment and into this through one or more airtight sluice devices.

8. A composting plant according to claim 1, including a device in the inlet zone for spreading the arriving raw material evenly over this zone said device comprising downwardly swivelling prongs mounted at a travelling trolley or crossbeam.

9. A method for composting organic material including household waste separated at the source, sludge, wood chippings, straw and farmyard manure, wherein the waste is fed into a sealed compartment where it is advanced over a process zone where an aerating up through the waste is performed, the oxygen concentration necessary for the putrefactive process is maintained by intake of fresh air and a process temperature is kept in the range of 55–62% C. as the surplus heat is removed from the air circulating in the compartment through a heat exchange system and that after a residence time of approximately 5 to 25 days in the process zone the now composted waste is discharged from the compartment.

10. A method according to claim 9, wherein the process air is recirculated and renewed through a branch pipe with a valve controlled by the oxygen concentration in the pressure side of the ventilator whereby the exchanged quantity of air reaches up to 50% of the recirculated quantity of air, and the sealed compartment is at a slightly lower pressure relative the surrounding atmosphere.

11. A composting apparatus for composting organic material which comprises:

an enclosed and sealed housing means having a generally horizontal floor which defines an inlet zone along one side of said housing means, an outlet zone along a second side of said housing means, and an aeration zone therebetween, delivery means for delivery of organic material to said inlet zone, discharge means for removing organic material from said outlet zone, transfer means for stirring and horizontally moving organic material across said generally horizontal floor of said housing means from said inlet zone through said aeration zone and to said outlet zone, ventilation means for supplying heated air upwardly through said organic material in said aeration zone to compost said organic material and produce waste air containing moisture, heat exchange means for removing heat and moisture from said waste air.

12. A composting apparatus according to claim 11, wherein said transfer means comprises a rotatable cylinder having helically arranged spikes extending outwardly therefrom.

13. A composting apparatus according to claim 12, including support means which supports said rotatable cylinder so as to extend downwardly into the organic waste in said aeration zone, and conveyor means for moving said support means between said first and second side of said housing means.

* * * * *